3,218,259
STABILIZATION OF LITHIUM MOLYBDATE SOLUTION
Ralph G. Verdieck, Havertown, and Lawrence J. Reader, Malvern, Pa., assignors to Foote Mineral Company, Exton, Pa., a corporation of Pennsylvania
No Drawing. Filed Nov. 29, 1963, Ser. No. 327,127
2 Claims. (Cl. 252—68)

This invention relates to lithium halide solutions used as absorption refrigeration media, and is particularly directed to the stabilization of such solutions containing dissolved lithium molybdate as a corrosion inhibitor.

Concentrated lithium halide solutions, and particularly concentrated lithium bromide solutions, are commonly used as the absorption media in absorption refrigeration systems because of the low vapor pressure of such solutions. To be effective, the solutions must be strongly concentrated, and like all salt solutions they are corrosive. In a closed system, however, their corrosive action can be countered by incorporation of certain corrosion inhibitors. Lithium molybdate, when dissolved in a concentrated lithium halide solution, is a very satisfactory corrosion inhibitor.

It has been found, however, that it is difficult to retain the lithium molybdate in solution in concentrated lithium halide solutions for a long enough period of time for it to provide corrosion protection to the ferrous metal parts of the refrigeration system. The solubility of lithium molybdate in concentrated lithium halide solutions is very low, and even the small amounts added for corrosion inhibition form solutions which are supersaturated with respect to the added lithium molybdate. When such solutions are cycled through an absorption refrigeration system, there is a marked tendency for the lithium molybdate to deposit in crystalline form where the most concentrated solution impinges on cooled surfaces; and its availability for corrosion inhibition is thus lost. As pointed out in the Stubblefield U.S. Patent No. 2,755,170, granted July 17, 1956, lithium molybdate performs its corrosion inhibiting function by forming a deposite or coating on the surface to be protected. The form of such deposited coating requires cycling of the lithium molybdate-bearing solution through the refrigeration apparatus for a substantial period of time (e.g., 24 to 48 hours). If it is caused to crystallize from the solution during the early stages of cycling the solution through newly built or newly installed apparatus, an adequate protective coating is not formed on the parts intended to be protected.

We have found that concentrated lithium halide solutions containing dissolved lithium molybdate as a corrosion inhibitor can be stabilized against premature crystallization or precipitation of the lithium molybdate by dissolving a soluble sulfate in the solution together with the lithium molybdate. Accordingly, the invention provides the method of stabilizing a concentrated aqueous lithium halide refrigerant solution containing a dissolved molybdate against precipitation or crystallization of the molybdate which comprises incorporating in such solution a soluble sulfate in an amount from 10% to 125% by weight of the dissolved molybdate. The soluble sulfate is preferably lithium sulfate. The amount of lithium sulfate employed should be in the range from 10 to 125 mg. per 100 mg. of lithium molybdate in the solution.

As concomitant to the above method, the invention provides an improved concentrated aqueous lithium halide absorptive refrigerant solution containing a dissolved molybdate as a corrosion inhibitor, which improved solution is characterized by the incorporation therein of a soluble sulfate in an amount from 10% to 125% (preferably 20% to 75%) by weight of the dissolved molybdate, whereby premature precipitation of the dissolved molybdate during cycling of the solution in a refrigeration system is prevented. As noted above, the preferred soluble sulfate is lithium sulfate, and the solution preferably contains from 10 mg. to 125 mg. of lithium sulfate per 100 mg. of the maximum intended lithium molybdate concentration. For most purposes the lithium sulfate concentration may be in the narrower range from 20 mg. to 75 mg. per 100 mg. of dissolved lithium molybdate.

Following is a description of a preferred embodiment of the invention, wherein a specific example of the improved stabilized refrigerant solution is set forth.

A typical refrigeration system utilizing an absorptive refrigerant medium is shown and described in the Sherwood U.S. Patent No. 2,557,573, granted July 19, 1951. In such apparatus the refrigeration medium (an aqueous solution of a salt having high solubility in water, such solution when concentrated having a low vapor pressure), is circulated through a generator wherein it is concentrated by heating to evaporate water therefrom, through a heat-exchanger when it is cooled, to an absorber where, in the cooled condition, it reabsorbs the water vapor. The system is designed so that such absorption causes an expansion of the vapor with consequent lowering of its temperature, producing a refrigeration effect. The solution returns from the absorber to the generator where it is again concentrated by evaporation, and again is cycled through the system.

As noted above, concentrated lithium halide solutions form suitable absorption refrigeration media, but like all salt solutions they promote corrosion of metal surfaces, particularly in the presence of atmospheric or dissolved oxygen. In a closed absorption refrigeration system such solutions can be rendered essentially non-corrosive by the incorporation in them of a dissolved molybdate, preferably lithium molybdate. During initial operation of an absorption refrigeration system using as the absorption medium a lithium halide solution which contains a dissolved molybdate as corrosion inhibitor, a protective film or coating forms on ferrous metal surfaces with which the solution comes in contact, preventing corrosion of such surface by the solution, and the protection thus afforded remains effective for so long as the system remains closed.

The solubility of lithium molybdate and other soluble molybdates in lithium halide solutions which are sufficiently concentrated to be effective absorption refrigeration media is extremely small. The molybdate may be introduced into the solution readily enough by blending a small volume of an aqueous solution of the molybdate salt with the concentrated lithium halide solution. But when such solution is cycled through the refrigeration apparatus and therein is subjected to the alternate heating and cooling that takes place in the generator, heat exchanger, and absorber, the molybdate tends to precipitate or crystallize on the cool absorber surfaces. Thus it is prematurely taken out of the cycling solution and is unable to form the protective coating or film which prevents corrosion of the metal surfaces of the refrigeration system.

The absorption medium is stabilized against such precipitation or crystallization of the dissolved molybdate, in accordance with the invention, by incorporating in such medium a quantity of a soluble sulfate. Any sulfate salt which is soluble in the refrigerant solution may be employed. However, we prefer to employ lithium sulfate, for this salt is soluble even in the most concentrated refrigerant solutions, and it introduces no undesirable constituent into the lithium halide solutions which commonly form the refrigeration medium.

The amount of dissolved molybdate corrosion inhibitor employed in the refrigerant medium is generally determined by the area of the metal surfaces which are to be protected against corrosion. Advantageously, the solution contains 600 to 700 mg. of lithium molybdate for each square foot of such surface. In a typical refrigeration system this calls for a concentration of 600 to 750 mg. per liter of lithium molybdate. Although lithium molybdate is readily soluble in water, it does not form stable solutions even in these low concentrations in highly concentrated lithium halide refrigerant solutions. Rather, when dissolved in such concentrated refrigerant solutions, it appears to form supersaturated solutions from which it is precipitated or crystallized when the solution is cycled through the temperature differences that exist between the generator and the absorber of a refrigeration system.

The amount of soluble sulfate required to stabilize a concentrated lithium halide solution against precipitation or crystallization therefrom of all dissolved molybdate is from 10% to 125% of the weight of the dissolved molybdate. A concentrated lithium halide solution containing dissolved lithium molybdate should have added to it from 10 mg. to 125 mg. per liter of lithium sulfate for each 100 mg. of dissolved lithium molybdate to ensure that there will be no precipitation of the latter when the solution is initially cycled through a refrigeration system. Ordinarily the lithium sulfate concentration in the refrigerant solution is in the narrower range of 20% to 75% by weight of the dissolved molybdate. Thus the preferred concentration of lithium sulfate is from 20 mg. to 75 mg. for each 100 mg. of dissolved lithium molybdate.

While lithium halide solutions in general may be used with success in absorption refrigeration systems, concentrated lithium bromide solutions are generally used because of the high solubility of this salt and the low vapor pressure of its solution at high dissolved salt concentration. Such solutions generally contain from 45% to 60% by weight of lithium bromide, plus a small amount of a dissolved molybdate as a corrosion inhibitor, the actual amount being dependent on the area of metal surface to be protected against corrosion. Such a solution, in accordance with the invention, also contains a dissolved sulfate in an amount from 10% to 125% by weight of the maximum intended molybdate concentration. Such solutions are sometimes prepared with only a portion of the ultimately intended molybdate concentration present; and the remainder of the molybdate corrosion inhibitor is added shortly before the solution is introduced into the refrigeration system. In accordance with this invention, the amount of dissolved sulfate present in such a solution should be based on the ultimately intended molybdate concentration and not on the concentration thereof initially introduced into the solution. Following is an example of a satisfactory aqueous lithium bromide refrigerant solution (nominally 53% to 55% LiBr, specific gravity 1.61) conforming to this invention:

Lithium bromide_____g./l__ 870
Lithium molybdate_____mg./l__ 700
Lithium sulfate_____mg./l__ 325
Lithium hydroxide to make 0.1 normal.

The concentration of a typical lithium bromide refrigerant solution in an absorption refrigeration system varies from a maximum of about 58% by weight of dissolved lithium bromide in the concentrated solution leaving the generator to a minimum lithium bromide concentration of about 49% by weight in the solution leaving the absorber. This concentration difference is owing, of course, to the greater amount of water in the latter solution than in the former, and there is a corresponding variation in the concentration of other dissolved salts in such a solution.

The following tabulation demonstrates the effectiveness of lithium sulfate for preventing precipitation of lithium molybdate from a concentrated lithium bromide solution. The tabulation shows the amount of lithium molybdate remaining in a solution prepared by dissolving 650 mg. per liter of lithium molybdate in a 49% lithium bromide solution containing the indicated quantity of lithium sulfate, evaporating such solution to a concentration of 58% by weight of lithium bromide, and then cooling the solution to 43° C. and holding it for the indicated period of time at that temperature:

| Holding time, hours | Li$_2$SO$_4$ concentration, percent | | | | | | |
|---|---|---|---|---|---|---|---|
| | 0.00 | 0.002 | 0.01 | 0.02 | 0.03 | 0.04 | 0.05 |
| 0 | 770 | 770 | 770 | 770 | 770 | 770 | 770 |
| 4 | 732 | 730 | 709 | 758 | _____ | 750 | 754 |
| 8 | 676 | 675 | 732 | 734 | 751 | 718 | 726 |
| 24 | 242 | 290 | 559 | _____ | 590 | 469 | 644 |
| 48 | 203 | 200 | 295 | 302 | 298 | 244 | 285 |

It will be noted that in the absence of lithium sulfate, a large fraction of the lithium molybdate had precipitated or crystallized from the solution within 24 hours, whereas in the solutions containing 0.01% or more of lithium sulfate most of the lithium molybdate remained in solution at the end of 24 hours. Even as little as 0.002% lithium sulfate was effective for increasing the amount of lithium molybdate still held in solution at the end of 24 hours.

While the lithium sulfate does not provide perfect stabilization of the lithium halide solution against precipitation or crystallization of the lithium molybdate, it does provide an adequate degree of stabilization to insure against premature precipitation of the lithium molybdate when the refrigeration solution is initially cycled through the refrigeration system. Thus the invention assures that lithium halide refrigerant solutions containing lithium molybdate has a corrosion inhibitor will be sufficiently stabilized against precipitation or crystallization of the latter so that it may be used with confidence that the ferrous metal components of the refrigeration system will be effectively guarded against corrosion.

We claim:
1. An absorptive aqueous refrigerant lithium bromide solution containing when concentrated to 58% by weight of lithium bromide and ready for initial cycling in a refrigeration system a small amount of lithium molybdate as a corrosion inhibitor and an amount of lithium sulfate in the range from 10 mg. to 125 mg. per 100 mg. of lithium molybdate.

2. An absorptive aqueous refrigerant lithium bromide solution containing when concentrated to 58% by weight of lithium bromide and ready for initial cycling in a refrigeration system a small amount of lithium molybdate as a corrosion inhibitor and an amount of lithium sulfate in the range from 20 mg. to 75 mg. per 100 mg. of lithium molybdate.

References Cited by the Examiner

UNITED STATES PATENTS 2,755,170   7/1956   Stubblefield et al. _____ 23—89
2,950,167   8/1960   Bohlmann et al. _____ 23—14.5

JULIUS GREENWALD, *Primary Examiner.*